United States Patent
Ding et al.

(10) Patent No.: US 10,698,426 B2
(45) Date of Patent: Jun. 30, 2020

(54) METHODS AND APPARATUS FOR MULTIPLE CHANNEL MASS FLOW AND RATIO CONTROL SYSTEMS

(71) Applicant: MKS Instruments, Inc., Andover, MA (US)

(72) Inventors: Junhua Ding, Boxborough, MA (US); Michael L'Bassi, Sterling, MA (US); Wayne Cole, Windham, NH (US)

(73) Assignee: MKS Instruments, Inc., Andover, MA (US)

( * ) Notice: Subject to any disclaimer, the term of this patent is extended or adjusted under 35 U.S.C. 154(b) by 120 days.

(21) Appl. No.: 15/973,190

(22) Filed: May 7, 2018

(65) Prior Publication Data
US 2019/0339725 A1    Nov. 7, 2019

(51) Int. Cl.
| G05D 7/06 | (2006.01) |
| G01F 1/36 | (2006.01) |
| G01F 1/50 | (2006.01) |
| G05B 17/02 | (2006.01) |

(52) U.S. Cl.
CPC ............. G05D 7/0664 (2013.01); G01F 1/36 (2013.01); G01F 1/50 (2013.01); G05B 17/02 (2013.01)

(58) Field of Classification Search
CPC ............ G05D 7/0664; G01F 1/36; G01F 1/50
See application file for complete search history.

(56) References Cited

U.S. PATENT DOCUMENTS

| 6,089,229 A * | 7/2000 | Bathe .................. A61M 16/12 128/203.12 |
| 6,631,334 B2 | 10/2003 | Grosshart |
| 6,945,123 B1 * | 9/2005 | Kuehl ................... A61M 16/01 73/861.42 |
| 7,536,865 B2 * | 5/2009 | Mikhail ................ B64D 13/00 60/782 |
| 7,621,290 B2 | 11/2009 | Ding et al. |
| 7,673,645 B2 | 3/2010 | Ding et al. |
| 8,849,466 B2 | 9/2014 | Ding |
| 8,997,791 B2 | 4/2015 | L'Bassi et al. |
| 9,348,339 B2 | 5/2016 | Ding et al. |
| 9,557,744 B2 | 1/2017 | Ding |
| 10,031,531 B2 | 7/2018 | Ding |
| 10,041,407 B2 * | 8/2018 | Nenmeni ................ F02C 9/18 |

(Continued)

FOREIGN PATENT DOCUMENTS

| WO | 02/052363 A1 | 2/2002 |
| WO | 2017/040100 A1 | 3/2017 |

OTHER PUBLICATIONS

International Search Report and Written Opinion for Int'l Application No. PCT/US2019/028904, titled: Methods and Apparatus for Multiple Channel Mass Flow and Ratio Control Systems, dated Jul. 31, 2019.

*Primary Examiner* — Vincent H Tran (74) *Attorney, Agent, or Firm* — Hamilton, Brook, Smith & Reynolds, P.C.

(57) ABSTRACT

Fluid control systems, including mass flow control systems, mass flow ratio control systems, and mass flow and ratio control systems, as well as corresponding methods for fluid control are provided. These systems allow one shared pressure sensor to be used for multiple flow channels, and a controller which can accurately determine mass flow on the basis of fluid pressure detected by this shared pressure sensor.

26 Claims, 8 Drawing Sheets

(56) References Cited

U.S. PATENT DOCUMENTS

| | | | |
|---|---|---|---|
| 2002/0042205 A1* | 4/2002 | McMillin | C23F 4/00 |
| | | | 438/710 |
| 2004/0112538 A1* | 6/2004 | Larson | H01L 21/67017 |
| | | | 156/345.33 |
| 2012/0227817 A1* | 9/2012 | Cruse | B01F 3/028 |
| | | | 137/1 |
| 2013/0025715 A1* | 1/2013 | Yamaguchi | F17D 1/00 |
| | | | 137/561 R |
| 2013/0117848 A1 | 5/2013 | Golshan et al. | |
| 2017/0060143 A1 | 3/2017 | Ding et al. | |
| 2017/0299420 A1* | 10/2017 | Shiroyama | G01F 25/0007 |
| 2017/0370763 A1* | 12/2017 | Brashear | G01F 1/86 |
| 2018/0246533 A1* | 8/2018 | Somani | G05D 7/0623 |
| 2019/0137309 A1* | 5/2019 | Sawada | G01F 1/42 |
| 2019/0204128 A1* | 7/2019 | Somani | G01F 1/40 |
| 2019/0243392 A1* | 8/2019 | Ding | C23C 16/45525 |

* cited by examiner

METHODS AND APPARATUS FOR MULTIPLE CHANNEL MASS FLOW AND RATIO CONTROL SYSTEMS

BACKGROUND

Multiple channel mass flow control systems are used to control the flow of fluids through multiple channels, allowing the combination of the fluids from the multiple channels into a shared flow channel in desired proportions. Multiple channel mass flow ratio control systems are used to control the flow of a fluid from a shared flow channel into multiple channels in desired ratios of mass flow. Such systems are used, for example, in semiconductor fabrication systems and other materials processing systems.

A semiconductor fabrication process can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc. Typically, components such as valves, pressure regulators, mass flow control systems (MFCS), mass flow ratio control systems (FRCS) are included in the gas metering system or in a flow path from the gas metering system to a processing tool.

In certain applications such as semiconductor fabrication applications, space is typically very limited, the systems need to be flexible (e.g., it is desirable that additional flow channels can be easily added to, removed from, or exchanged within existing MFCS or FRCS), and high precision is required. Further, low cost and less complex systems are generally desirable.

SUMMARY OF THE INVENTION

Fluid control systems, including multiple channel mass flow control systems, multiple channel mass flow ratio control systems, and multiple channel mass flow and ratio control systems, as well as corresponding methods of fluid control are provided. These systems and methods allow space efficient, flexible, cost effective, and simpler fluid control than existing corresponding systems.

An embodiment of a fluid control system includes a plurality of flow channels, each flow channel comprising a flow restrictor, a flow regulating valve and a channel pressure sensor between the flow restrictor and the flow regulating valve; a shared flow channel carrying fluids to or from the plurality of flow channels, for each flow channel, the flow restrictor being between the channel pressure sensor and the shared flow channel; a shared pressure sensor in the shared flow channel configured to detect a shared flow channel pressure; and a controller that determines mass flow through each of the flow channels based on channel pressures and the shared flow channel pressure and controls the flow regulating valves of the flow channels to control mass flow through each flow channel.

Each flow channel of the plurality of flow channels can include a temperature sensor.

The controller can determine mass flow through each flow channel based on property of the fluid flowing therethrough, property of the flow restrictor, and flow channel property between the flow restrictor and the shared pressure sensor. The flow channel property can be the volume and the length of the flow channel from the flow restrictor to the shared pressure sensor.

The controller can determine, recursively, (1) mass flow through each flow channel, (2) channel pressures for positions that are adjacent to the flow restrictors and opposite to the channel pressure sensors of the plurality of flow channels, and (3) total mass flow through the shared channel.

The controller can determine mass flow through a flow channel of the plurality of flow channels by (i) assuming a flow channel pressure adjacent to the flow restrictor and opposite to the channel pressure sensor of the flow channel, the channel pressure sensor providing a detected flow channel pressure, (ii) determining the mass flow through the flow channel based on the flow channel pressure adjacent to the flow restrictor and opposite to the channel pressure sensor and the detected flow channel pressure for the flow channel, (iii) determining total mass flow on the basis of mass flows through each of the flow channels of the plurality of flow channels, (iv) calculating the flow channel pressure adjacent to the flow restrictor and opposite to the channel pressure sensor of the flow channel using the total mass flow determined in step (iii), and repeating steps (ii) to (iv).

The shared flow channel can be downstream from the plurality of flow channels.

The shared flow channel can also be upstream from the plurality of flow channels.

In further embodiments, the fluid control system further includes a second plurality of flow channels, each flow channel of the second plurality of flow channels comprising a flow restrictor, a flow regulating valve and a channel pressure sensor between the flow restrictor and the flow regulating valve; the shared flow channel carrying fluids from the plurality of flow channels to the second plurality of flow channels; for each flow channel of the second plurality of flow channels, the flow restrictor being between the channel pressure sensor and the shared flow channel; wherein the controller further determines mass flow through each of the flow channels of the second plurality of flow channels based on channel pressures and the shared flow channel pressure and controls the flow regulating valves of the flow channels to control mass flow through each flow channel.

Each flow channel of the second plurality of flow channels can further comprise a temperature sensor.

The plurality of flow channels can be part of an integrated system.

The plurality of flow channels and the second plurality of flow channels can be part of an integrated system.

The shared pressure sensor need not be part of the integrated system (i.e., it can be external).

The fluid can be a liquid or a gas; however, typically, it is a gas.

Another embodiment is a fluid control method. The fluid control method comprises flowing fluids through a plurality of flow channels, each flow channel comprising a flow restrictor and a flow regulating valve; flowing fluids to or from the plurality of flow channels through a shared flow channel; detecting a shared flow channel pressure in the shared flow channel; detecting a flow channel pressure for each flow channel between its flow regulating valve and its flow restrictor; determining mass flow through each of the flow channels based on the flow channel pressures and the shared flow channel pressure; and controlling the flow regulating valves of the flow channels to control mass flow through each flow channel.

The fluid control method can further comprise detecting a flow channel temperature for each flow channel between its flow regulating valve and its flow restrictor.

The mass flow through each flow channel can be determined based on property of the fluid flowing therethrough, property of the flow restrictor, and flow channel property between the flow restrictor and where the shared flow channel pressure is detected.

Mass flow through each flow channel, channel pressures for positions that are adjacent to the flow restrictors and opposite to the channel pressure sensors of the plurality of flow channels, and total mass flow through the shared channel, can be determined recursively.

Determining mass flow through a flow channel of the plurality of flow channels can comprise (i) assuming a flow channel pressure adjacent to the flow restrictor and opposite to the channel pressure sensor of the flow channel, (ii) determining the mass flow through the flow channel based on the flow channel pressure adjacent to the flow restrictor and opposite to the channel pressure sensor and the detected flow channel pressure for the flow channel, (iii) determining total mass flow on the basis of mass flows through each of the flow channels of the plurality of flow channels, (iv) calculating the flow channel pressure adjacent to the flow restrictor and opposite to the channel pressure sensor of the flow channel using the total mass flow determined in step (iii), and repeating steps (ii) to (iv).

The fluid control method can further comprise flowing fluids from the plurality of flow channels through the shared channel and into a second plurality of flow channels, each flow channel of the second plurality of flow channels comprising a flow restrictor and a flow regulating valve; detecting a flow channel pressure and flow channel temperature for each flow channel of the second plurality of flow channels between its flow regulating valve and its flow restrictor; and determining mass flow through each of the flow channels of the second plurality of flow channels based on the flow channel pressures and the shared flow channel pressure.

The fluid control method can comprise detecting a flow channel temperature for each flow channel of the second plurality of flow channels between its flow regulating valve and its flow restrictor.

The fluids controlled with the fluid control methods can be liquids or gases, and typically are gases.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Fluid control systems, including mass flow control systems, mass flow ratio control systems, and mass flow and ratio control systems, as well as corresponding methods for fluid control are provided. As described in the following, the systems provided herein have significant advantages compared to prior art systems.

Figure 1:
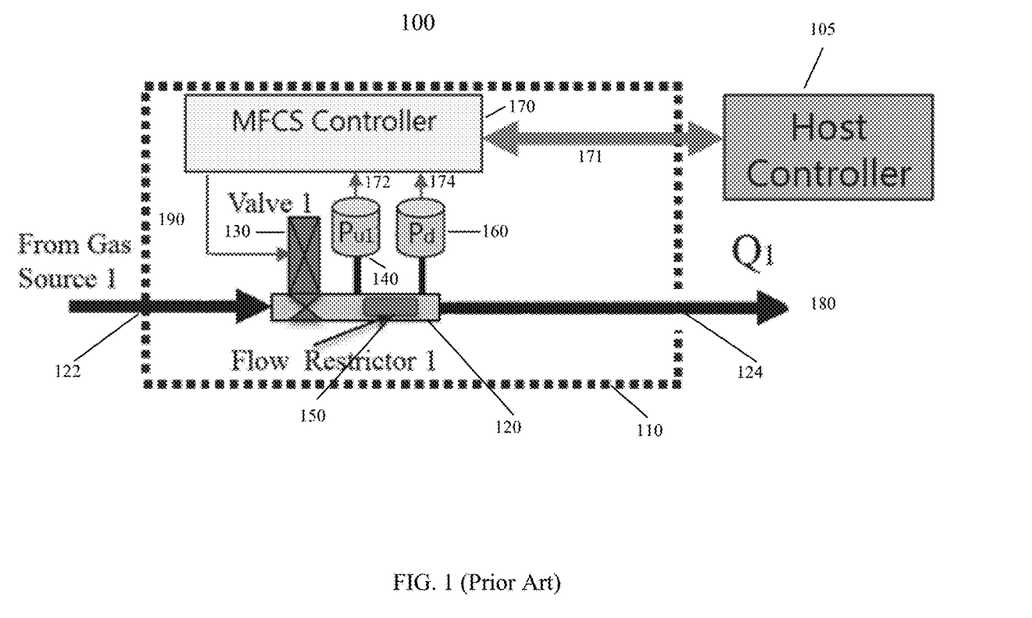
FIG. 1 is a schematic of a prior-art single channel mass flow control system.

FIG. 1 shows a prior art single channel mass flow control system 100 including a host controller 105 and an integrated mass flow control system 110. The integrated mass flow control system 110 includes a flow channel 120 configured to allow flow of a gas within the flow channel from an upstream position 122 to a downstream position 124, a valve 130 configured to regulate the flow of gas within the flow channel, an internal (i.e., inside an integrated system) upstream pressure sensor 140, a flow restrictor 150, a downstream pressure sensor 160, and a mass flow control system (MFCS) controller 170. The flow restrictor 150 leads to a pressure drop, that is, the pressure detected by the upstream pressure sensor 140 is higher than the pressure detected by the downstream pressure sensor 160. The MFCS controller 170 communicates 171 with a host controller 105 (e.g., to receive a mass flow control setpoint) and receives upstream pressure signals 172 and downstream pressure signals 174 which provide the basis for calculating the mass flow 180 ($Q_1$) through the integrated mass flow control system 110. On the basis of the calculated mass flow 180 and a desired mass flow set point, the MFCS controller 170 controls 190 valve 130 to regulate the mass flow 180 to the desired mass flow.

Importantly, in prior art mass flow control systems, each flow channel has two associated pressure sensors (i.e., the upstream pressure sensor 140 and the downstream pressure sensor 174) in close proximity to the flow restrictor to allow accurate detection of the pressure drop across the flow restrictor 150, and, thus, accurate determination of mass flow.

In contrast, the fluid control systems and methods provided herein allow one pressure sensor (i.e., the downstream pressure sensor in a mass flow control system or the upstream pressure sensor in a mass flow ratio control system) to be at a distance from the flow restrictor and can be operated with a single MFCS controller, which leads to several significant advantages. Because the pressure sensor can be distant, it can be shared by multiple channels. Use of a single MFCS controller as well as use of a shared pressure sensor is more cost efficient and makes the fluid control systems more space efficient, the latter being particularly important for applications in certain industries such as the semiconductor industry. Further, when combined with a single MFCS controller, a shared pressure sensor can also greatly simplify the complexity of the communication within the fluid control system, between pressure sensors and MFCS controller, and also between the MFCS controller and a host controller. Yet further, a shared pressure sensor can simplify and improve calibration, make multiple channel systems more flexible, and allow use of higher accuracy and larger pressure sensors as the shared pressure sensor, which can improve overall accuracy of the fluid control system, without increasing cost.

Figure 2:
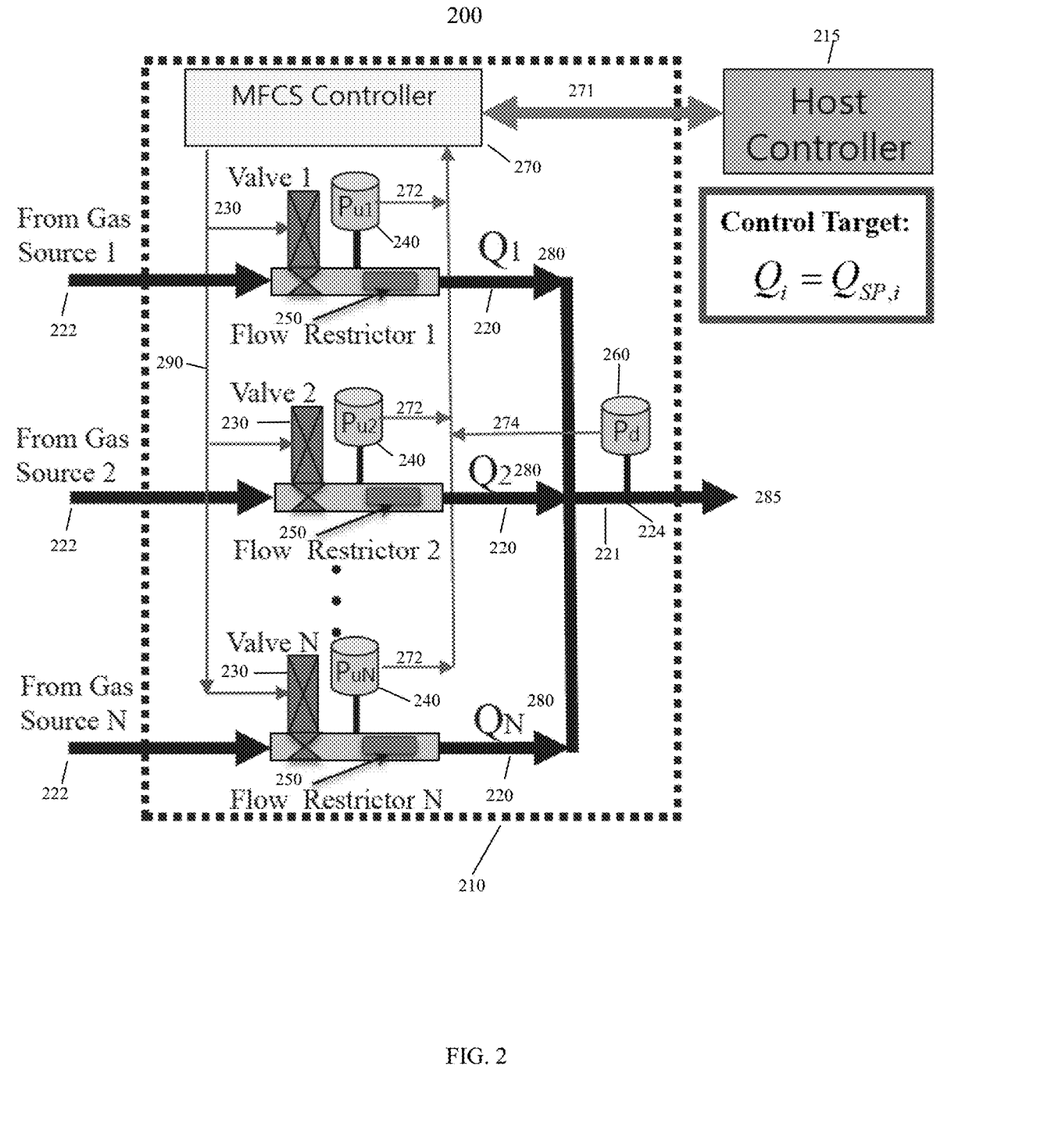
FIG. 2 is a schematic of a multiple channel mass flow control system including an internal downstream pressure sensor shared by the multiple channels.

FIG. 2 illustrates a multiple channel mass flow control system 200, including an integrated multiple channel mass flow control subsystem 210 in communication with a host controller 215. The system 200 has a plurality of flow channels 220 (for ease of illustration only the first, second and N-th flow channel are shown), which can be the same (e.g., same diameter and same length) but more typically are different (e.g., different length), as illustrated here. The flow channels 220 are connected to form a shared flow channel 221. Each flow channel 220 is configured to allow flow of a fluid within the flow channel between an upstream position 222 of the flow channel and a downstream position 224, along the shared flow channel 221, where the downstream pressure is detected. Each flow channel further has a valve 230 configured to regulate the flow of fluid within the respective flow channel. The valves can be the same or different. Each flow channel 220 further has an upstream pressure sensor 240 and a flow restrictor 250. An internal, shared downstream pressure sensor 260 detects the fluid pressure within the shared flow channel 221 at the position 224. A MFCS controller 270 communicates 271 with a host controller 215 (e.g., to receive a set of mass flow control setpoints) and is configured to receive an upstream pressure signal 272 from each of the upstream pressure sensors 240 and downstream pressure signal 274 from the downstream pressure sensor 260. In this example, both the MFCS controller 270 and the downstream pressure sensor 260 are part of the integrated system 210. However, in alternative embodiments, the mass flow control system controller 270 and/or the downstream pressure sensor 260 can be external. Further, in alternative embodiments, more than one MFCS controller 270 can be used, internal and/or external; however, typically, one MFCS controller 270 is used as further MFCS controller increase cost, space requirements, and complexity of the communication between controllers and sensors in the system. The MFCS controller 270 is configured to be able to control each of the valves 230, independently, to control respective mass flow 280 through each of the flow channels 220 and, thereby, total mass flow 285 through the shared flow channel 221. In this regard the controller is configured to send valve control signals 290 to each of the valves 230.

The downstream pressure sensor 260 is distant from each of the flow restrictors 250. To be able to accurately measure fluid flow through each flow channel 220, the fluid pressures of fluid on both sides and adjacent to each of the flow restrictors need to be known.

Generally, for a given flow channel i the respective internal pressure sensor (e.g., an upstream pressure sensor 240) detecting fluid pressure adjacent to its flow restrictor provides one of these two required pressure values for a given flow channel, for example, it provides the upstream pressure of the i-th flow channel $P_{u,i}$. The downstream pressure $P_{d,i}$ of the i-th flow channel at a position adjacent to the restrictor can be estimated by the following equation:

$$P_{d,i} = f_{Pd}(P_d, Q_t, V_i, L_i) \quad (1),$$

where $f_{Pd}$ is a function of the shared downstream pressure $P_d$ detected by the distant downstream pressure sensor at a position along the shared flow channel (e.g., pressure sensor 260 at position 224 along shared flow channel 221), the total flow through the device $Q_t$ (i.e., the flow through the shared flow channel), and the volume $V_i$ and length $L_i$ of the i-th flow channel from the restrictor to shared pressure sensor at the second position.

The function $f_{Pd}$ can be obtained by empirical data or experiment, for example, as a linear expression $$f_{Pd}(P_d, Q_t, V_i, L_i) = k_{i,1} \cdot P_d + k_{i,2} \cdot Q_t + k_{i,3} \cdot V_i + k_{i,4} \cdot L_i \quad (2),$$

where $k_{i,1}$, $k_{i,2}$, $k_{i,3}$ and $k_{i,4}$ are empirically or experimentally obtained linear coefficients.

As is known in the art, the flow through the flow restrictor of the i-th channel ($Q_i$) can be expressed as a function of the upstream and the downstream pressure ($P_{u,i}$ and $P_{d,i}$) of the restrictor (i.e., the pressures immediately adjacent to the restrictor), the cross section of the flow path through the restrictor ($A_i$), and gas properties such as specific heat ratio $\gamma$ and molecular weight M $$Q_i = f_Q(P_{u,i}, P_{d,i}, A_i, \gamma, M) \quad (3).$$

The function $f_Q$ can be obtained by empirical data or experiment.

In the case of a flow nozzle as flow restrictor, the following equation can be used $$Q_i = C_i \cdot A_i \cdot P_{u,i} \cdot \left(\frac{R \cdot T}{M} \frac{2\gamma}{\gamma-1}\right)^{1/2} \cdot \left(\frac{P_{d,i}}{P_{u,i}}\right)^{1/\gamma} \cdot \left[1 - \left(\frac{P_{d,i}}{P_{u,i}}\right)^{(\gamma-1)/\gamma}\right]^{1/2}, \quad (4)$$

where $C_i$ is the discharge coefficient of the i-th flow restrictor, R the universal gas constant, and T the gas temperature.

In the case of a pipe as restrictor, the following equation can be used $$Q_i = \frac{\pi \cdot d_i^4}{128\mu \cdot L_i} \frac{(P_{u,i} + P_{d,i})}{2}(P_{u,i} - P_{d,i}), \quad (5)$$

where $d_i$ is the diameter of the i-th pipe, $L_i$ the length of i-th pipe, and $\mu$ the gas viscosity.

Other flow restrictors and corresponding equations describing mass flow through these flow restrictors can be used, and are known in the art. See, for example, The American Society of Mechanical Engineers, "ASME MFC-3M-2004 Measurement of Fluid Flow in Pipes Using Orifice, Nozzle, and Venturi", 2004.

The total flow through the device $Q_t$ is calculated by summarizing all individual channel flows $Q_i$ (i=1,2, ... N). Because the $Q_i$ calculation is depended on the downstream pressure $P_{d,i}$, a recursive calculation is needed for determining $Q_i$, $P_{d,i}$ and $Q_t$. For example, first an initial $P_{d,i}$ value is assumed and an initial flow $Q_i$ determined as described above. Then the total flow $Q_t$ is determined by summing all $Q_i$. Then the total flow $Q_t$ can be used to recalculate $P_{d,i}$ and $Q_i$. This recursive calculation is repeated until the values converge within a set convergence threshold.

On the basis of the calculated mass flows $Q_i$, the MFCS controller can control the valves of each flow channel to a desired mass flow set point using feedback control methods.

In the multiple channel mass flow control system illustrated in FIG. 2, the shared downstream pressure sensor 260 is an internal sensor, part of the integrated system. This downstream pressure sensor can also be external as illustrated in FIG. 3.

Figure 3:
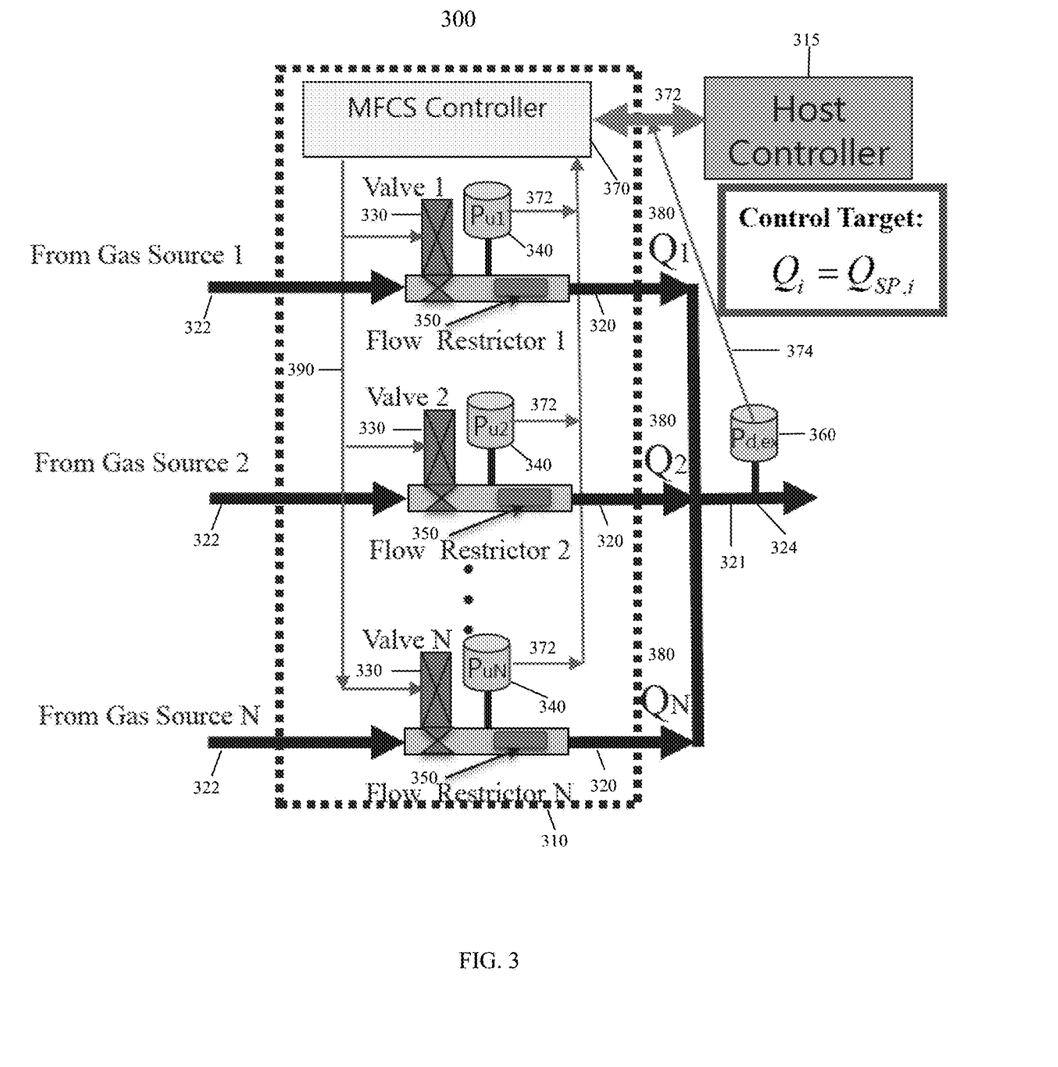
FIG. 3 is a schematic of a multiple channel mass flow control system including an external downstream pressure sensor shared by the multiple channels.

FIG. 3 illustrates a multiple channel mass flow control system 300, including an integrated multiple channel mass flow control subsystem 310 in communication with a host controller 315. The system 300 has a plurality of flow channels 320 (for ease of illustration only the first, second and N-th flow channel are shown), which can be the same (e.g., same diameter and same length) but more typically are different (e.g., different length), as illustrated here. The flow channels 320 are connected to form a shared flow channel 321. Each flow channel 320 is configured to allow flow of a fluid within the flow channel between an upstream position 322 of the flow channel and a downstream position 324, along the shared flow channel 321, where the downstream pressure is detected. Each flow channel further has a valve 330 configured to regulate the flow of fluid within the respective flow channel. The valves can be the same or different. Each flow channel 320 further has an upstream pressure sensor 340 and a flow restrictor 350. An external, shared downstream pressure sensor 360 detects the fluid pressure within the shared flow channel 321 at the position 324. A MFCS controller 370 communicates 371 with a host controller 315 (e.g., to receive a set of mass flow control setpoints) and is configured to receive an upstream pressure signal 372 from each of the upstream pressure sensors 340 and downstream pressure signal 374 from the downstream pressure sensor 360. In this example, the MFCS controller 370 is part of the integrated system 310. However, in alternative embodiments, the MFCS controller 370 can be external. Further, in alternative embodiments, more than one MFCS controller 370 can be used, internal and/or external; however, typically, one MFCS controller 370 is used as further MFCS controller increase cost, space requirements, and complexity of the communication between controllers and sensors in the system. The MFCS controller 370 is configured to be able to control each of the valves 330, independently, to control respective mass flow 380 through each of the flow channels 320 and, thereby, total mass flow 385 through the shared flow channel 321. In this regard the controller is configured to send valve control signals 390 to each of the valves 330. The controller is further configured to estimate the downstream pressure $P_{d,i}$ of the i-th flow channel at a position adjacent to the restrictor using Equation (1) and/or (2) above. With these calculated downstream pressures, the MFCS controller can further estimate the mass flows in the flow channels according to Equations (3) and/or (4) or (5).

Figure 4:
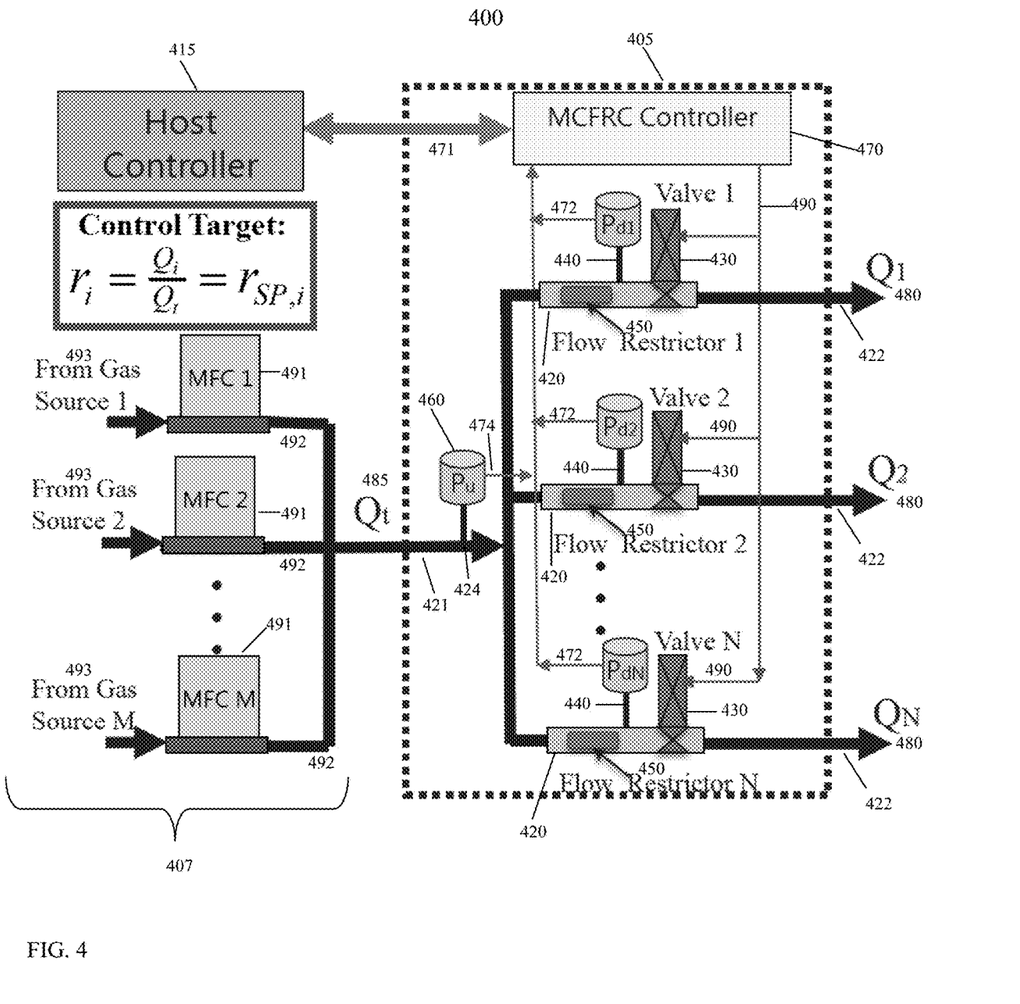
FIG. 4 is a schematic of a multiple channel mass flow ratio control system including an internal upstream pressure sensor shared by the multiple channels.

FIG. 4 illustrates a fluid control system 400 including a multiple channel mass flow ratio control system 405 and a multiple channel mass flow control system 407, which provides the fluid input to system 405. The integrated mass flow ratio control system 405 is configured to communicate with a host controller 415, and has a plurality of flow channels 420 (for ease of illustration only the first, second and N-th flow channel are shown), which can be the same (e.g., same diameter and same length) but more typically are different (e.g., different length), as illustrated here. The flow channels 420 are connected to form a shared flow channel 421. Each flow channel 420 is configured to allow flow of a fluid within the flow channel between an upstream position 424 of the flow channel and a downstream position 422, along the shared flow channel 421, where a shared upstream pressure is detected. Each flow channel 420 further has a valve 430 configured to regulate the flow of fluid within the respective flow channel. The valves can be the same or different. Each flow channel 420 further has a downstream pressure sensor 440 and a flow restrictor 450. An internal, shared upstream pressure sensor 460 detects the fluid pressure within the shared flow channel 421 at the position 424. A multiple channel flow ratio (MCFR) controller 470 communicates 471 with a host controller 415 (e.g., to receive a mass flow control setpoint) and is configured to receive a downstream pressure signal 472 from each of the downstream pressure sensors 440 and a shared upstream pressure signal 474 from the shared upstream pressure sensor 460. In this example, the MCFR controller 470 is part of the integrated system 405. However, in alternative embodiments, the MCFR controller 470 can be external. Further, in alternative embodiments, more than one MCFR controller 470 can be used, internal and/or external; however, typically, one MCFR controller 470 is used as further MCFR controller increase cost, space requirements, and complexity of the communication between controllers and sensors in the system. The MCFR controller 470 is configured to be able to control each of the valves 430 to control respective mass flow 480 through each of the flow channels 420 to achieve the targeted flow ratio setpoint with respect to the total input flow 485 through a knowing feedback control method (e.g. PID control method). In this regard the controller is configured to send valve control signals 490 to each of the valves 430. The shared upstream pressure sensor 460 is distant from each of the flow restrictors 450. To be able to accurately measure fluid flow through each flow channel 420, the fluid pressures of fluid on both sides and adjacent to each of the flow restrictors 450 need to be known.

Generally, for a given flow channel j the respective internal pressure sensor (e.g., a downstream pressure sensor 440) detecting fluid pressure adjacent to its flow restrictor provides one of these two required pressure values for a given flow channel, for example, it provides the downstream pressure of the j-th flow channel $P_{d,j}$. The upstream pressure $P_{u,j}$ of the j-th flow channel at a position adjacent to the restrictor can be estimated by the following equation:

$$P_{u,j} = f_{Pu}(P_u, Q_t, V_j, L_j) \qquad (6),$$

where $f_{Pu}$ is a function of the shared upstream pressure $P_u$ detected by the distant upstream pressure sensor at an upstream position along the shared flow channel (e.g., pressure sensor 460 at upstream position 424 along shared flow channel 421 to the flow restrictor 450), the total flow through the device $Q_t$ (i.e., the flow through the shared flow channel, e.g., channel 421), and the volume $V_j$ and length $L_1$ of the j-th flow channel from the flow restrictor to the shared pressure sensor at the upstream position.

The function $f_{Pu}$ can be obtained by empirical data or experiment, for example, as a linear expression $$f_{Pu}(P_u, Q_t, V_j, L_j) = k_{j,1} \cdot P_u + k_{j,2} \cdot Q_t + k_{j,3} \cdot V_j + k_{j,4} \cdot L_j \qquad (7)$$

where $k_{j,1}$, $k_{j,2}$, and $k_{j,4}$ are empirically or experimentally obtained linear coefficients. With these calculated pressures, the MFCS controller can further estimate the mass flows in the flow channels according to above Equations (3) and/or (4) or (5).

As further illustrated in FIG. 4, the integrated multiple channel mass flow ratio control system 405 can be combined with a prior art known multiple channel mass flow control system 407, but it can also receive its fluid input directly from a fluid source (not shown here). The multiple channel mass flow control system 407 can comprises multiple prior art known mass flow control systems 491, for example, as illustrated in FIG. 1, which are configured such that flow from a plurality of channels 492 is combined into the shared flow channel 421. Each of the mass flow control systems 491 receives fluid from a source 493.

In the integrated multiple channel mass flow ratio control system 405 of FIG. 4, the shared upstream pressure sensor 460 is an internal sensor, part of the integrated system. This upstream pressure sensor can also be external as illustrated in FIG. 5.

Figure 5:
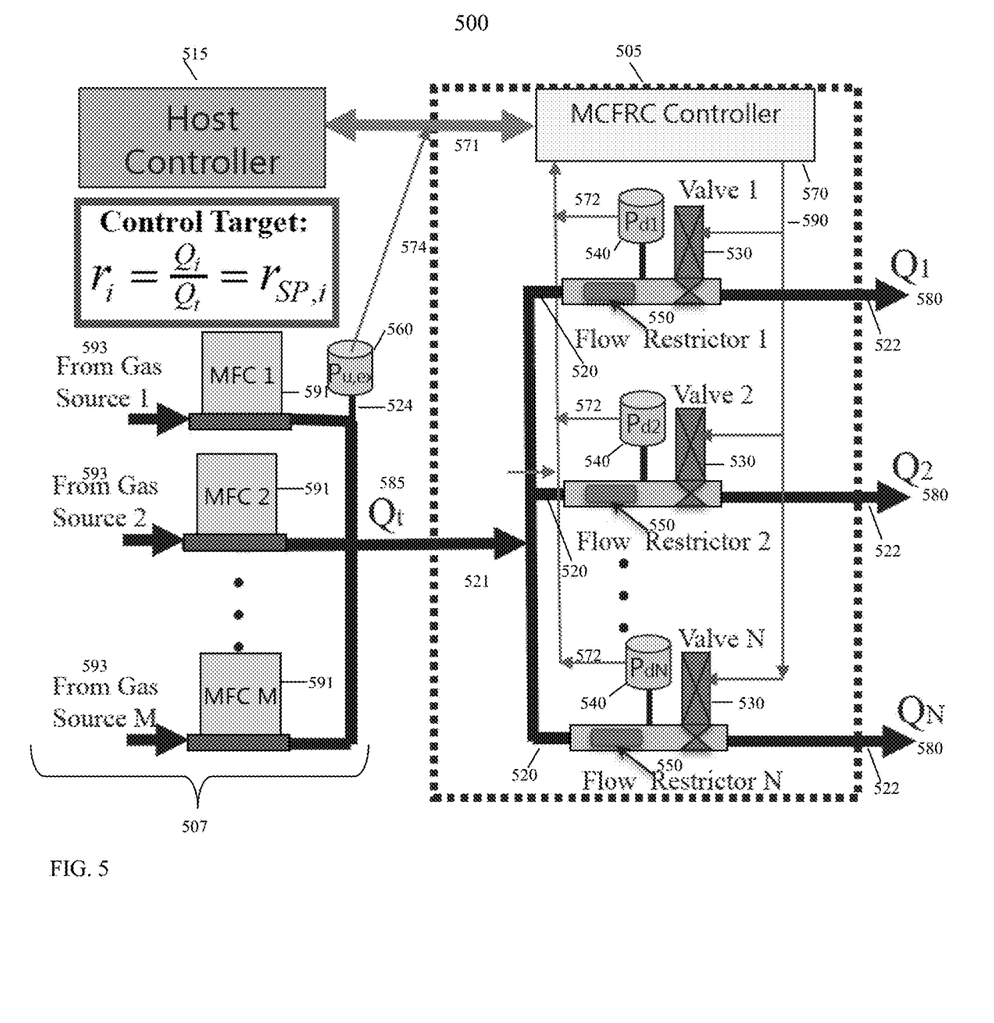
FIG. 5 is a schematic of a multiple channel mass flow ratio control system including an external upstream pressure sensor shared by the multiple channels.

FIG. 5 illustrates a fluid control system 500 including an integrated multiple channel mass flow ratio control system 505 and a multiple channel mass flow control system 507, which provides the fluid input to system 505. The integrated mass flow ratio control system 505 is configured to communicate with a host controller 515, and has a plurality of flow channels 520 (for ease of illustration only the first, second and N-th flow channel are shown), which can be the same (e.g., same diameter and same length) but more typically are different (e.g., different length), as illustrated here. The flow channels 520 are connected to form a shared input flow channel 521. Each flow channel 520 is configured to allow flow of a fluid within the flow channel between an upstream position 524 of the flow channel and a downstream position 522, along the shared flow channel 521, where a shared upstream pressure is detected. Each flow channel 520 further has a valve 530 configured to regulate the flow of fluid within the respective flow channel. The valves can be the same or different. Each flow channel 520 further has a downstream pressure sensor 540 and a flow restrictor 550. An external, shared upstream pressure sensor 560 detects the fluid pressure within the shared flow channel 521 at the position 524. A MCFR controller 570 communicates 571 with a host controller 515 (e.g., to receive a mass flow ratio control setpoint) and is configured to receive a downstream pressure signal 572 from each of the downstream pressure sensors 540 and a shared upstream pressure signal 574 from the shared upstream pressure sensor 560. In this example, the MCFR controller 570 is part of the integrated system 505. However, in alternative embodiments, the MCFR controller 570 can be external. Further, in alternative embodiments, more than one MCFR controller 570 can be used, internal and/or external; however, typically, one MCFR controller 570 is used as further MFCS controller increase cost, space requirements, and complexity of the communication between controllers and sensors in the system. The MCFR controller 570 is configured to be able to control each of the valves 530 to control respective mass flow 580 through each of the flow channels 520 to achieve the targeted flow ratio setpoint with respect to the total input flow 585 through a knowing feedback control method (e.g. PID control method). In this regard the controller is configured to send valve control signals 590 to each of the valves 530. The controller is further configured to estimate the upstream pressure $P_{u,i}$ of the i-th flow channel at a position adjacent to the restrictor using Equation (6) and/or (7) above. With these calculated upstream pressures, the MCFR controller can further estimate the mass flows in the flow channels according to Equations (3) and/or (4) or (5) and further calculate the corresponding flow ratio for each flow channel.

As further illustrated in FIG. 5, the integrated multiple channel mass flow ratio control system 505 can be combined with a prior art known multiple channel mass flow control system 507, but it can also receive its fluid input directly from a fluid source (not shown here). The multiple channel mass flow control system 507 can comprise multiple prior art known mass flow control systems 591, for example, as illustrated in FIG. 1, which are configured such that flow from a plurality of channels 592 is combined into the shared flow channel 521. Each of the mass flow control systems 591 receives a fluid from a source 593.

The multiple channel mass flow control systems described herein (e.g., the system 200 of FIG. 2) can be combined with the multiple channel mass flow ratio control systems described herein (e.g., the system 405 of FIG. 4) to form a multiple channel mass flow and ratio control system. In combination, these systems require only one shared pressure sensor, which acts as the shared downstream pressure sensor for the mass flow control system and as the shared upstream pressure sensor for the mass flow ratio control system. Further, the combined system requires only one controller which acts as both the MCFR controller and MFCS controller.

Figure 6:
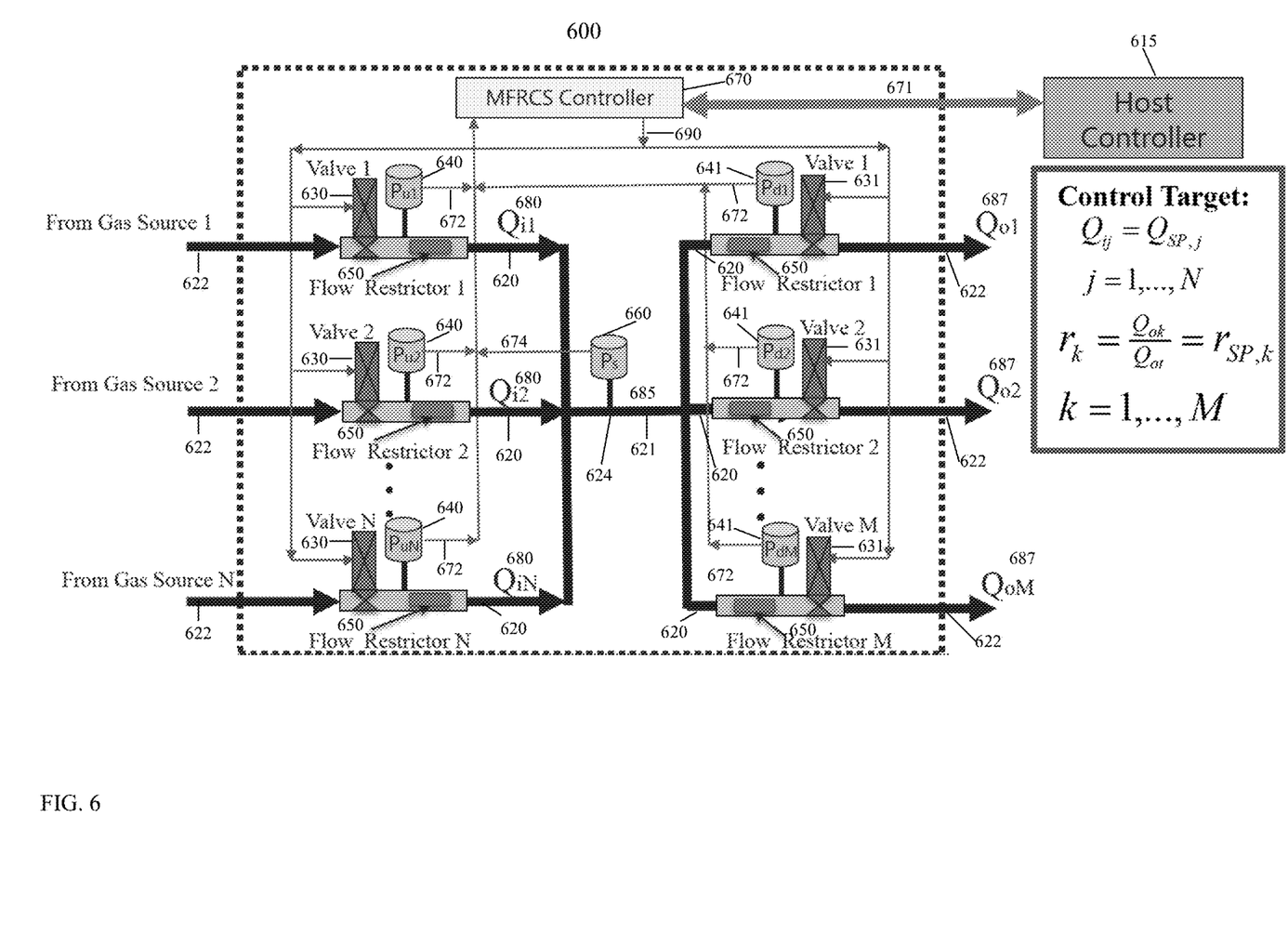
FIG. 6 is a schematic of an integrated multiple channel mass flow and ratio control system including one pressure sensor, downstream to some of the multiple channels and upstream to other channels, which is shared by the multiple channels.

FIG. 6 illustrates an integrated multiple channel mass flow and ratio control system 600. The integrated mass flow ratio control system 600 is configured to communicate with a host controller 615, and has a plurality of flow channels 620 (divided into a first set of N flow channels (i.e., a first plurality of flow channels) for the mass flow control side and a second set of M channels (i.e., a second plurality of flow channels) for the mass flow ratio control side; for ease of illustration only the first, second and N or M-th flow channel of each side are shown), which can be the same (e.g., same diameter and same length) but more typically are different (e.g., different length), as illustrated here. The flow channels 620 are connected to form a shared flow channel 621. Each flow channel 620 is configured to allow flow of a fluid within the flow channel between a first position 622 of the flow channel and a second position 624, along the shared flow channel 621, where a shared pressure is detected. Each flow channel 620 further has a valve (upstream valve 630 or downstream valve 631) configured to regulate the flow of fluid within the respective flow channel. The valves can be the same or different. Each flow channel 620 further has a pressure sensor (upstream 640 for the mass flow control part of the system and downstream 641 for the mass flow ratio part of the system) and a flow restrictor 650. An internal shared pressure sensor 660 detects the fluid pressure within the shared flow channel 621 at the position 624. A controller 670 communicates 671 with the host controller 615 (e.g., to receive a set of mass flow and mass flow ratio control setpoints) and is configured to receive a pressure signal 672 from each of the pressure sensors 640 and each of the pressure sensors 641, and a shared pressure signal 674 from the shared pressure sensor 660. In this example, the controller 670 is part of the integrated system 600. However, in alternative embodiments, the controller 670 can be external. Further, in alternative embodiments, more than one controller 670 can be used, internal and/or external; however, typically, one controller 670 is used as further controllers increase cost, space requirements, and complexity of the communication between controllers and sensors in the system. The controller 670 is configured to be able to control each of the valves 630 and 631, independently, to control respective mass flow 680 through each of the flow channels 620 and to control respective mass flow 687 through each of the flow channels 622, respectively, and, thereby, total mass flow 685 through the shared flow channel 621. In this regard the controller is configured to send valve control signals 690 to each of the valves 630. The controller is further configured to estimate the downstream pressure $P_{d,i}$ of the i-th flow channel (of the first set of channels corresponding to the mass flow control part) at a position adjacent to the restrictor 650 using Equation (1) and/or (2) above and to estimate the upstream pressure $P_{u,i}$ of the i-th flow channel (of the second set of channels corresponding to the mass flow ratio control part) at a position adjacent to the restrictor using Equation (6) and/or (7) above. With these calculated downstream and upstream pressures as well as the detected upstream and downstream pressures, respectively, the controller can further estimate the mass flows in the flow channels according to Equations (3) and/or (4) or (5).

The use of only one shared pressure sensor (for example, as part of a multiple channel mass flow and ratio control system as illustrated in FIG. 6) is particularly advantageous, for example, because it can allow for self-calibration and cross-validation.

An example self-calibration method comprises the following steps:
(1) Closing all upstream (inlet) valves 630 and opening all downstream (outlet) valve 631;
(2) Pumping down the system pressure within the flow channels (e.g., by connecting one or more pumps, directly or indirectly, to one or more of the flow channels that have an open downstream valve 631) and monitoring the shared pressure sensor reading;
(3) Closing all downstream valves 631 when the system pressure drops to a predetermined low pressure threshold;
(4) Providing a mass flow setpoint for the i-th inlet mass flow channel (e.g., from a gas source 1 as indicated in FIG. 6) and the controller opens and controls the i-th upstream valve 630 to regulate the mass flow (measured by the pressure based flow sensor as $Q_m$) to the flow setpoint;
(5) Measuring the pressure in the system by the shared pressure sensor and the gas temperature;
(6) Calculate the actual mass flow $Q_a$ by the method of rate of pressure rising, i.e., $Q_a = V \cdot Tstp \cdot [d(P/T)/dt]$, where V is the total system volume between the i-th upstream valve 630 and all other downstream valves (assuming all other valves are closed);
(7) Closing the i-th upstream valve 630 and open all downstream valves to pump down the system pressure;
(8) Repeating steps (3) to (7) with different flow setpoints which cover the whole flow range, considered for a given application, of the i-th flow channel;
(9) Storing the actual flow measurements ($Q_a$) and the measured flow ($Q_m$) as the calibration data for the i-th inlet flow channel;
(10) Repeating steps (1) to (9) for the next inlet flow channel until all inlet flow channels have been calibrated;
(11) Closing all upstream valves 630 and downstream valves 631;
(12) Opening the j-th downstream (outlet) valve 631;
(13) Providing a flow setpoint to the k-th inlet flow channel and stabilizing the mass flow;
(14) Storing both the measured flow by the k-th inlet flow channel as $Q_a$, and j-th outlet flow channel as $Q_m$;
(15) Repeating steps (11) to (14) with different flow setpoint for the j-th inlet flow channel which cover the whole flow range of the k-th outlet flow channel;
(16) Storing the actual flow measurements ($Q_a$) and the measured flow ($Q_m$) as the calibration data for the j-th outlet flow channel;
(17) Repeating steps (11) to step (16) for the next inlet flow channel until all outlet flow channels have been calibrated;

An example cross-validation method comprises the following steps:
(1) Closing all upstream valves 630 and downstream valves 631;
(2) Providing a flow setpoint to the i-th inlet flow channel and opening the j-th downstream valve;
(3) Comparing the flow difference between the i-th inlet flow measurement and the j-th outlet flow measurement;
(4) If the flow difference is above the predetermined flow error threshold, either the i-th inlet or the j-th outlet flow measurement is not accurate;
(5) Repeat steps (1) to (4) for all inlet and out flow channels.

The fluid control systems can be integrated systems, that is, the elements of the systems are included within one housing or enclosure. Typically, for the fluid control systems described herein, the housing provides at least fluid input and outputs and allows for input and output of signals, which allows incorporation of the integrated system within larger systems.

Each flow channel of a plurality of flow channels can be part of a separate integrated system, or a subset or all of the flow channels can be part of an integrated system. Typically, for each flow channel that is part of an integrated system, one valve, one flow restrictor, and one fluid pressure sensor positioned between the valve and the flow restrictor, are also part of the integrated system, and optionally, a temperature sensor is also part of the integrated system.

In integrated fluid control systems, the one or more flow channels of the integrated systems allow fluid flow from an inlet of the integrated system to an outlet of the integrated system.

The fluid control systems can have one or more controllers; however, typically, the systems have one controller which can be integrated, as illustrated, for example, in FIGS. 2-6. The controller can also be external. An external controller can be used to control a plurality of integrated systems provided herein. For example, a plurality of integrated systems, each comprising only one valve, one flow restrictor, one pressure sensor between the valve and the flow restrictor, and one optional temperature sensor, can be controlled with an external controller. This overall fluid control system setup allows great flexibility. For example, an existing fluid control system at an application site, having an external controller and external shared pressure sensor, can easily be changed to add, remove, or exchange an integrated system from the overall system Commercially available controllers can be used in the provided fluid control systems and fluid control methods provided here. However, the controller and communication system has to be configured to allow operation of the fluid control systems as provided herein.

Further, commercially available valves, pressure sensors, flow channels, and communication systems can be selected, as known in the art, depending on the particular application requirements.

The fluid control systems have a plurality of flow channels (e.g., at least two, at least five, or at least eight flow channels). Typically, all of the flow channels are connected (i.e., to allow fluid connection during operation) to form a shared flow channel. Integrated fluid control systems in which all flow channels are connected to one shared flow channel are illustrated, for example, in FIG. 2 (system 200), in FIG. 3 (system 300), in FIG. 4 (system 405), FIG. 5 (system 505) and FIG. 6 (system 600).

Typically, it is desirable that flow channel pressure sensors between valve and flow restrictor, detect the pressure of the fluid within the channel at a position as close as possible to the flow restrictor, that is, it is desired that the distance between the position where the pressure is detected and the flow restrictor (or, more specifically, the position where fluid enters or exits the flow restrictor) is as short as practically possible. However, the distance can be greater, which will lead to less accurate flow measurement. Typically, the distance is less than the diameter of the pipe where the fluid flows. The provided fluid control systems further have a shared pressure sensor which is configured to detect a fluid pressure in a shared flow channel at a position distant from the flow restrictors associated with the flow channels of the system. In multiple channel systems, this pressure sensor can be installed in or along the shared flow channel. Use of a distant and shared pressure sensor allows the pressure sensor to be external to an integrated multiple channel system, as illustrated, for example, in FIG. 3 and FIG. 5. However, for accurate flow measurement and control, the pressure drop across the flow restrictor for each channel, needs to be determined. Typically, it is desired that the distance between the position where the shared pressure is detected and each of the flow restrictors (or, more specifically, the position where fluid enters or exits the flow restrictor) is as short as practically possible. The fluid control systems provided here allow this distance to each of the flow restrictors to be much larger than the distance between the channel pressure sensor of a give flow channel and its flow restrictor. For example, the distance can be more than the diameter of the pipe where the fluid flows.

Commercially available and prior art known flow restrictors can be used in the fluid control systems provided. Suitable flow restrictors include, but are not limited to, nozzles, orifices, laminar flow elements, and porous media.

The flow channels of the fluid control systems can include temperature sensors. Typically, each flow channel has a temperature sensor that detects the fluid temperature at a position between the valve and flow restrictor of the flow channel. This is particularly important in applications in which the fluids (typically, gases) flowing through the flow channels of a plurality of flow channels are to be at different temperatures. However, when several or all of the flow channels of the plurality (and/or second plurality) of flow channels are to be at the same temperature, fewer temperature sensors may be required. For example, several or all flow channels including the gas flowing therethrough may be kept at the same temperature and one or more (but fewer than one per flow channel) temperature sensors can be used that measure the temperature at which the flow channels are (or even an entire integrated system is) kept.

In further embodiments, fluid control methods are provided. These fluid control methods can use any of the fluid control systems described herein.

Figure 7:
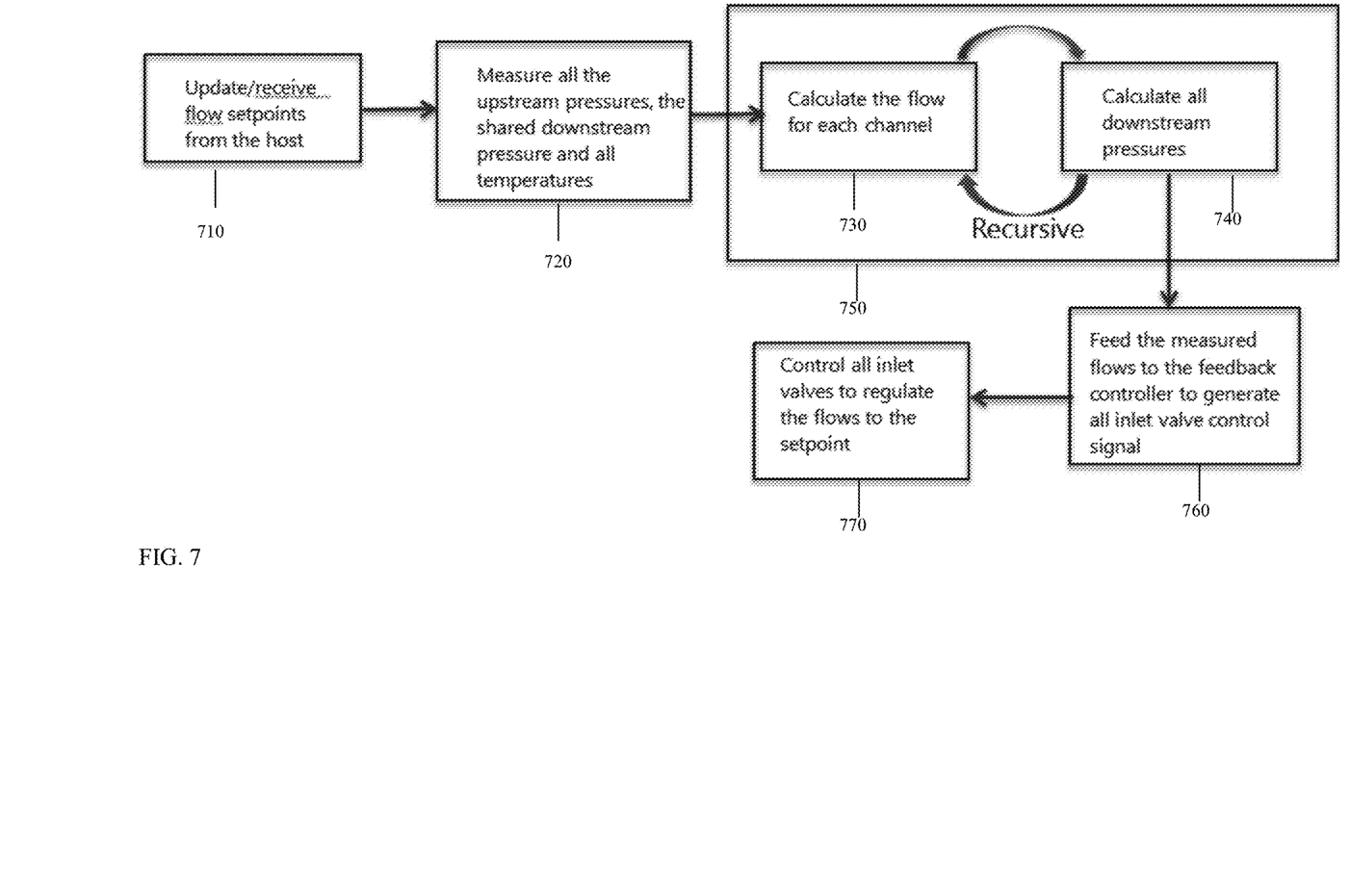
FIG. 7 is a flow diagram that illustrates the control of inlet valves to regulate mass flows to flow setpoints for a multiple channel mass flow control system.

In further embodiments, the multiple channel mass flow control systems (e.g., as illustrated in FIGS. 2 and 3) and corresponding fluid control methods allow independent control of inlet valves (e.g. valves 230 or valves 330) to regulate mass flows through each of the flow channels of the plurality of flow channels to mass flow setpoints. FIG. 7 shows an example flow diagram of a method that allows such control. The method includes in step 710 updating or receiving flow setpoints (typically, for each of the flow channels of the plurality of flow channels) from a host controller (which is typically shared by all of the flow channels, e.g., 215 or 315). The method further includes at step 720 measuring all the upstream pressures (e.g., with pressure sensors 240 or 340), the shared downstream pressure (e.g., at positions 224 or 324 with shared pressure sensor 260 or 360) and all temperatures (in cases in which the individual flow channels of the plurality of flow channels are to be at different temperatures, typically, each flow channel comprises a temperature sensor, usually detecting the fluid temperature between the flow channel's valve and flow restrictor; otherwise, in case where several flow channels are to be at the same temperature, fewer flow channels may be required; also, in embodiments, temperature sensors can be external). With the information measured at step 720, the mass flow for each channel can be calculated as described above. Further, with these calculated mass flows, all downstream pressure can be calculated (see step 740). Steps 730 and 740 are repeated until convergence to a set convergence threshold (see 750). Steps 730 and 740 (as thus 750) are typically performed by a controller (e.g., 215 or 315), which receives the measured information, and performs the calculations described in detail above. At step 760, the measured flows are fed to the controller to generate all inlet valve control signals, based on which, the controller controls, at step 770, the inlet valves to regulate the flows to the setpoints.

Figure 8:
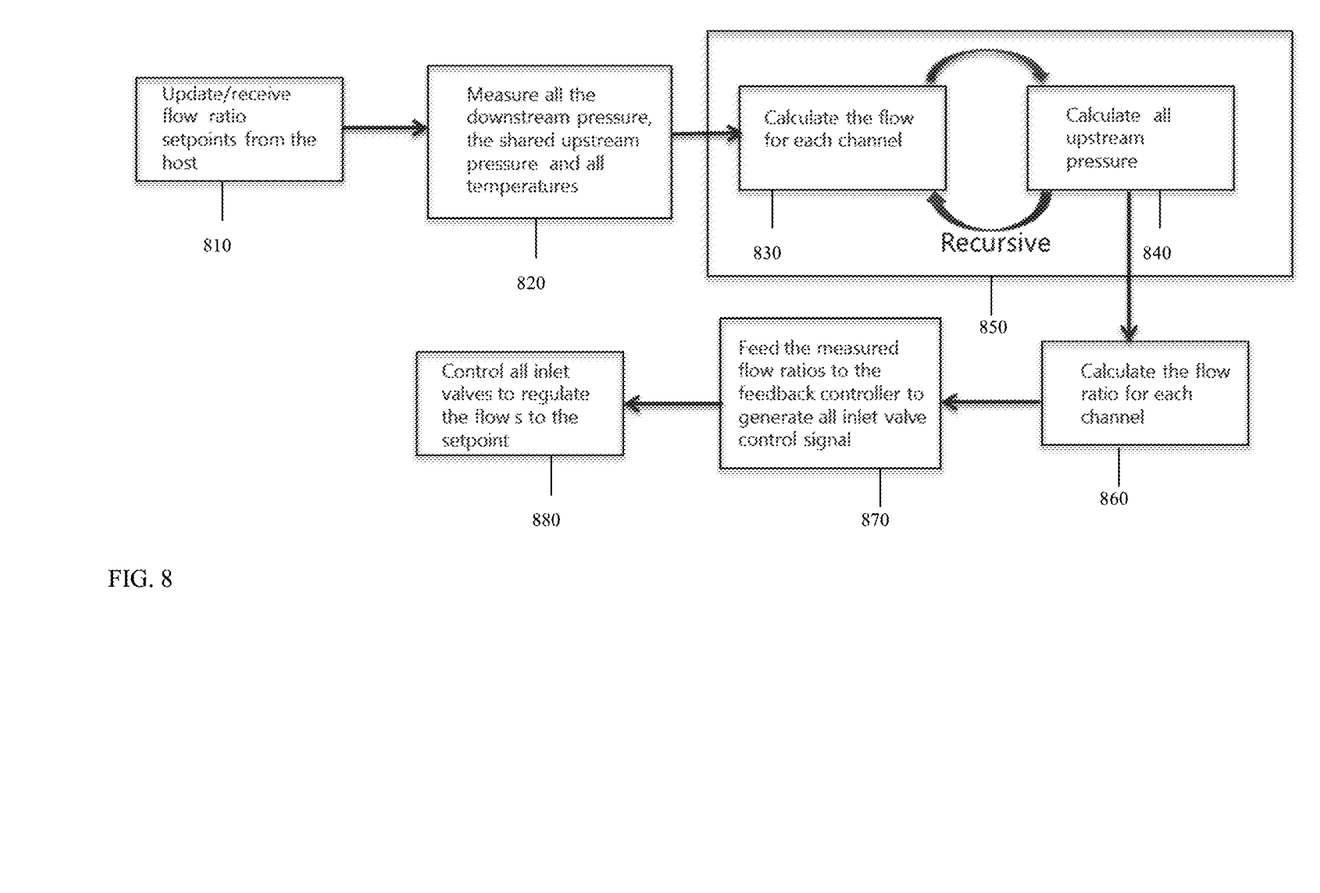
FIG. 8 is a flow diagram that illustrates the control of outlet valves to regulate mass flows to flow ratio setpoints for a multiple channel mass ratio control system.

In further embodiments, the multiple channel mass ratio control systems (e.g., as illustrated in FIGS. 4 and 5) and corresponding fluid control methods allow independent control of outlet valves (e.g. valves 430 or valves 530) to regulate mass flows through each of the flow channels of the plurality of flow channels to mass flow setpoints. FIG. 8 shows an example flow diagram of a method that allows such control. The method includes in step 810 updating or receiving flow ratio setpoints (typically, for each of the flow channels of the plurality of flow channels) from a host controller (which is typically shared by all of the flow channels, e.g., 405 or 505). The method further includes at step 820 measuring all the downstream pressures (e.g., with pressure sensors 440 or 540), the shared upstream pressure (e.g., at positions 424 or 524 with shared pressure sensor 460 or 560) and all temperatures (in cases in which the individual flow channels of the plurality of flow channels are to be at different temperatures, typically, each flow channel comprises a temperature sensor, usually detecting the fluid temperature between the flow channel's valve and flow restrictor; otherwise, in case where several flow channels are to be at the same temperature, fewer flow channels may be required; also, in embodiments, temperature sensors can be external, e.g., when an entire integrated system is kept at a given temperature). With the information measured at step 820, the mass flow for each channel can be calculated as described above. Further, with these calculated mass flows, all upstream pressures can be calculated (see step 840). Steps 830 and 840 are repeated until convergence to a set convergence threshold (see 850). Steps 830 and 840 (and thus 850) are typically performed by a controller (e.g., 405 or 505), which receives the measured information, and performs the calculations described in detail above. At step 860, the measured flows are fed to the controller to generate all outlet valve control signals, based on which, the controller controls, at step 870, the outlet valves to regulate the flows to the target flow ratio setpoints.

In further embodiments, the multiple channel mass flow and ratio control systems (e.g., as illustrated in FIG. 6) and corresponding fluid control methods allow independent control of inlet valves (e.g. valves 630) and outlet valves (e.g., valves 631) to regulate mass flows through each of the flow channels of the plurality of flow channels to mass flow setpoints. The mass flow control part of the system can use the method as illustrated by the flow diagram of FIG. 7 and the mass flow ratio control part of the system can use the method as illustrated by the flow diagram of FIG. 8. In these systems, the shared pressure is the downstream pressure for the mass flow control part and the upstream pressure for the mass flow control system.

The fluid control systems of the present application may be just hardware, but generally, fluid control methods of the present application are implemented in software in a hardware system (typically, as software implemented on the controller) comprising a data processor, associated memory and input output devices. The processor routines (e.g. of the controllers described herein, including routines corresponding to the calculations and methods steps describe herein) and data may be stored on a non-transitory computer readable medium as a computer program product.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A fluid control system comprising:
a plurality of flow channels carrying fluids, each flow channel comprising a flow restrictor, a flow regulating valve and a channel pressure sensor between the flow restrictor and the flow regulating valve;
a shared flow channel carrying the fluids to or from the plurality of flow channels, the flow restrictor in each flow channel being between the channel pressure sensor and the shared flow channel;
a shared pressure sensor in the shared flow channel configured to detect a shared flow channel pressure; and
a controller that determines mass flow through each of the flow channels based on channel pressures and the shared flow channel pressure and controls the flow regulating valves of the flow channels to control mass flow through each flow channel, wherein the controller determines through recursive calculation (1) channel pressures for positions that are adjacent to the flow restrictors and opposite to the channel pressure sensors of the plurality of flow channels, (2) mass flow through each flow channel, and (3) total mass flow through the shared channel.

2. The fluid control system of claim 1, wherein the controller determines mass flow through each flow channel based on property of the fluid flowing therethrough, property of the flow restrictor, and flow channel property between the flow restrictor and the shared pressure sensor.

3. The fluid control system of claim 2, wherein the controller determines mass flow through a flow channel of the plurality of flow channels by (i) assuming a flow channel pressure adjacent to the flow restrictor and opposite to the channel pressure sensor of the flow channel, the channel pressure sensor providing a detected flow channel pressure, (ii) determining the mass flow through the flow channel based on the flow channel pressure adjacent to the flow restrictor and opposite to the channel pressure sensor and the detected flow channel pressure for the flow channel, (iii) determining total mass flow on the basis of mass flows through each of the flow channels of the plurality of flow channels, (iv) calculating the flow channel pressure adjacent to the flow restrictor and opposite to the channel pressure sensor of the flow channel using the total mass flow determined in step (iii), and repeating steps (ii) to (iv).

4. The fluid control system of claim 3, wherein the shared flow channel is downstream from the plurality of flow channels.

5. The fluid control system of claim 4, wherein the shared flow channel is upstream from the plurality of flow channels.

6. The fluid control system of claim 4, further comprising a second plurality of flow channels, each flow channel of the second plurality of flow channels comprising a flow restrictor, a flow regulating valve and a channel pressure sensor between the flow restrictor and the flow regulating valve;
the shared flow channel carrying fluids from the plurality of flow channels to the second plurality of flow channels;
for each flow channel of the second plurality of flow channels, the flow restrictor being between the channel pressure sensor and the shared flow channel; wherein the controller further determines mass flow through each of the flow channels of the second plurality of flow channels based on channel pressures and the shared flow channel pressure and controls the flow regulating valves of the flow channels to control mass flow through each flow channel.

7. The fluid control system of any claim 6, wherein the plurality of flow channels and the second plurality of flow channels are part of an integrated system.

8. The fluid control system of claim 7, wherein the shared pressure sensor is not part of the integrated system.

9. The fluid control system of claim 4, wherein the controller calculates a flow channel pressure adjacent to a flow restrictor and opposite to a channel pressure sensor of an i-th flow channel, the i-th flow channel being upstream from the shared flow channel, using Equation (1): $P_{d,i} = f_{pd}(P_d, Q_t, V_i, L_i)$ (1); where $f_{Pd}$ is a function of downstream pressure $P_d$ detected by the shared pressure sensor, total flow through the shared flow channel $Q_t$, and volume $V_i$ and length $L_i$ of the i-th flow channel from its restrictor to the shared pressure sensor.

10. The fluid control system of claim 9, wherein $f_{Pd}$ is provided by Equation (2): $f_{Pd}(P_d, Q_t, V_i, L_i) = k_{i,1} \cdot P_d + k_{i,2} \cdot Q_t + k_{i,3} \cdot V_i + k_{i,4} \cdot L_i$ (2); where $k_{i,1}$, $k_{i,2}$, $k_{i,3}$ and $k_{i,4}$ are empirically or experimentally obtained linear coefficients.

11. The fluid control system of claim 4, wherein the controller calculates a flow channel pressure adjacent to a flow restrictor and opposite to a channel pressure sensor of a j-th flow channel using Equation (6): $P_{u,j} = f_{Pu}(P_u, Q_t, V_j, L_j)$ (6); where $f_{Pu}$ is a function of upstream pressure $P_u$ detected by the shared pressure sensor, total flow through the shared flow channel $Q_t$, and volume $V_j$ and length $L_j$ of the j-th flow channel from its restrictor to the shared pressure sensor.

12. The fluid control system of claim 11, wherein $f_{Pu}$ is provided by Equation $f_{Pu}(P_u, Q_t, V_j, L_j) = k_{j,1} \cdot P_u + k_{j,2} \cdot Q_t + k_{j,3} \cdot V_j + k_{j,4} \cdot L_j$ (7); where $k_{j,1}$, $k_{j,2}$, $k_{j,3}$ and $k_{j,4}$ are empirically or experimentally obtained linear coefficients.

13. A fluid control method, comprising:
flowing fluids through a plurality of flow channels, each flow channel comprising a flow restrictor and a flow regulating valve;
flowing the fluids to or from the plurality of flow channels through a shared flow channel;
detecting a shared flow channel pressure in the shared flow channel;
detecting a flow channel pressure for each flow channel between its flow regulating valve and its flow restrictor;
determining mass flow through each of the flow channels based on the flow channel pressures and the shared flow channel pressure by recursively calculating (1) mass flow through each flow channel, (2) channel pressures for positions that are adjacent to the flow restrictors and opposite to the channel pressure sensors of the plurality of flow channels, and (3) total mass flow through the shared channel; and
controlling the flow regulating valves of the flow channels to control mass flow through each flow channel.

14. The fluid control method of claim 13, wherein mass flow through each flow channel is determined based on property of the fluid flowing therethrough, property of the flow restrictor, and flow channel property between the flow restrictor and where the shared flow channel pressure is detected.

15. The fluid control method of claim 13, wherein determining mass flow through a flow channel of the plurality of flow channels comprises (i) assuming a flow channel pressure adjacent to the flow restrictor and opposite to the channel pressure sensor of the flow channel, (ii) determining the mass flow through the flow channel based on the flow channel pressure adjacent to the flow restrictor and opposite to the channel pressure sensor and the detected flow channel pressure for the flow channel, (iii) determining total mass flow on the basis of mass flows through each of the flow channels of the plurality of flow channels, (iv) calculating the flow channel pressure adjacent to the flow restrictor and opposite to the channel pressure sensor of the flow channel using the total mass flow determined in step (iii), and repeating steps (ii) to (iv).

16. The fluid control method of claim 13, further comprising flowing fluids from the plurality of flow channels through the shared channel and into a second plurality of flow channels, each flow channel of the second plurality of flow channels comprising a flow restrictor and a flow regulating valve;
  detecting a flow channel pressure and flow channel temperature for each flow channel of the second plurality of flow channels between its flow regulating valve and its flow restrictor; and
  determining mass flow through each of the flow channels of the second plurality of flow channels based on the flow channel pressures and the shared flow channel pressure.

17. The fluid control method of claim 16, further comprising detecting a flow channel temperature for each flow channel of the second plurality of flow channels between its flow regulating valve and its flow restrictor.

18. The fluid control method of claim 13, further comprising calculating a flow channel pressure adjacent to a flow restrictor and opposite to a channel pressure sensor of an i-th flow channel, the i-th flow channel being upstream from the shared flow channel, using Equation (1): $P_{d,i} = f_{Pd}(P_d, Q_t, V_i, L_i)$ (1); where $f_{Pd}$ is a function of downstream pressure $P_d$ detected by the shared pressure sensor, total flow through the shared flow channel $Q_t$, and volume $V_i$ and length $L_i$ of the i-th flow channel from its restrictor to the shared pressure sensor.

19. The fluid control system of claim 18, wherein $f_{Pd}$ is provided by Equation (2): $f_{Pd}(P_d, Q_t, V_i, L_i) = k_{i,1} \cdot P_d + k_{i,2} \cdot Q_t + k_{i,3} \cdot V_i + k_{i,4} \cdot L_i$ (2); where $k_{i,1}$, $k_{i,2}$, $k_{i,3}$ and $k_{i,4}$ are empirically or experimentally obtained linear coefficients.

20. The fluid control method of claim 13, further comprising calculating a flow channel pressure adjacent to a flow restrictor and opposite to a channel pressure sensor of a j-th flow channel, the j-th flow channel being downstream from the shared flow channel, using Equation (6): $P_{u,j} = f_{Pu}(P_u, Q_t, V_j, L_j)$ (6); where $f_{Pd}$ is a function of upstream pressure $P_u$ detected by the shared pressure sensor, total flow through the shared flow channel $Q_t$, and volume $V_j$ and length $L_j$ of the j-th flow channel from its restrictor to the shared pressure sensor.

21. The fluid control system of claim 20, wherein $f_{Pu}$ is provided by Equation (7): $f_{Pu}(P_u, Q_t, V_j, L_j) = k_{j,1} \cdot P_u + k_{j,2} \cdot Q_t + k_{j,3} \cdot V_j + k_{j,4} \cdot L_j$ (7); where $k_{j,1}$, $k_{j,2}$, $k_{j,3}$ and $k_{j,4}$ are empirically or experimentally obtained linear coefficients.

22. A fluid control system comprising:
  a plurality of flow channels, each flow channel comprising a flow restrictor, a flow regulating valve and a channel pressure sensor between the flow restrictor and the flow regulating valve;
  a second plurality of flow channels, each flow channel of the second plurality of flow channels comprising a flow restrictor, a flow regulating valve and a channel pressure sensor between the flow restrictor and the flow regulating valve;
  a shared flow channel carrying fluids from the plurality of flow channels to the second plurality of flow channels;
  in each flow channel of the plurality of flow channels and the second plurality of flow channels, the flow restrictor being between the channel pressure sensor and the shared flow channel;
  a shared pressure sensor in the shared flow channel configured to detect a shared flow channel pressure; and
  a controller that determines mass flow through each of the flow channels in the plurality of flow channels and in the second plurality of flow channels based on channel pressures and the shared flow channel pressure and controls the flow regulating valves of the flow channels to control mass flow through each flow channel.

23. The fluid control system of any claim 22, wherein the plurality of flow channels and the second plurality of flow channels are part of an integrated system.

24. The fluid control system of claim 23, wherein the shared pressure sensor is not part of the integrated system.

25. A fluid control method comprising:
  flowing fluids through a plurality of flow channels and through a second plurality of flow channels, each flow channel comprising a flow restrictor and a flow regulating valve;
  flowing fluids from the plurality of flow channels to the second plurality of flow channels through a shared flow channel;
  detecting a shared flow channel pressure in the shared flow channel;
  detecting a flow channel pressure for each flow channel between its flow regulating valve and its flow restrictor;
  determining mass flow through each of the flow channels based on each flow channel pressure and the shared flow channel pressure; and
  controlling the flow regulating valves of the flow channels to control mass flow through each flow channel.

26. The fluid control method of claim 25, further comprising detecting a flow channel temperature for each flow channel of the second plurality of flow channels between its flow regulating valve and its flow restrictor.

* * * * *